(12) United States Patent
Kuhnelt et al.

(10) Patent No.: US 9,726,245 B2
(45) Date of Patent: Aug. 8, 2017

(54) PROFILED BAR, AND VEHICLE SPRING PRODUCED THEREFROM

(71) Applicant: Hendrickson Commercial Vehicle Systems Europe GmbH, Judenburg (AT)

(72) Inventors: Gerhard Kuhnelt, Oberweg (AT); Jorg Zamberger, Fohnsdorf (AT)

(73) Assignee: Hendrickson Commercial Vehicle Systems Europe GmbH, Judenburg (AT)

( * ) Notice: Subject to any disclaimer, the term of this patent is extended or adjusted under 35 U.S.C. 154(b) by 0 days.

(21) Appl. No.: 14/418,220

(22) PCT Filed: Jul. 25, 2013

(86) PCT No.: PCT/AT2013/000124
§ 371 (c)(1),
(2) Date: Jan. 29, 2015

(87) PCT Pub. No.: WO2014/019002
PCT Pub. Date: Feb. 6, 2014

(65) Prior Publication Data
US 2015/0260251 A1   Sep. 17, 2015

(30) Foreign Application Priority Data
Jul. 30, 2012   (AT) .................... A 845/2012

(51) Int. Cl.
*F16F 1/26*   (2006.01)
*B60G 11/02*   (2006.01)
(Continued)

(52) U.S. Cl.
CPC ............ *F16F 1/185* (2013.01); *B21D 53/886* (2013.01); *B60G 11/02* (2013.01); *F16F 1/26* (2013.01);
(Continued)

(58) Field of Classification Search
CPC ............... B60G 11/02; B60G 2202/11; B60G 2202/116; B60G 2202/117;
(Continued)

(56) References Cited

U.S. PATENT DOCUMENTS 108,165 A * 10/1870 Montgomery ......... A63H 33/40
428/587
129,297 A   7/1872 Cyrus
(Continued)

FOREIGN PATENT DOCUMENTS

CN   1032911   5/1989
DE   468 105 C   11/1928
(Continued)

OTHER PUBLICATIONS

CN Office Action, dated Nov. 23, 2015; Application No. 201380050545.7.
(Continued)

*Primary Examiner* — Anna Momper
(74) *Attorney, Agent, or Firm* — Cook Alex Ltd.

(57) ABSTRACT

A vehicle spring for a spring system, includes a spring body (20) and is produced, in particular rolled, from a profiled bar (1) made of a flat steel bar, in particular spring steel, in a hot deformation process. The profiled bar (1) or the spring body (20) has at least one material recess (6) which is provided over the length of the profiled bar or the spring body at least in some regions. The cross-sectional shape of the profiled bar (1) can be the same over the entire length of the profiled bar, whereas the cross-sectional shape in the spring body (20) can vary over the length of the spring body.

22 Claims, 5 Drawing Sheets (51) Int. Cl.
    *F16F 1/18*    (2006.01)
    *B21D 53/88*    (2006.01)
(52) U.S. Cl.
    CPC .. *B60G 2202/11* (2013.01); *B60G 2206/8109* (2013.01); *Y10T 29/49611* (2015.01); *Y10T 428/12389* (2015.01)
(58) Field of Classification Search
    CPC .... B60G 2206/428; F16F 1/185; F16F 1/187; F16F 15/073; F16F 2238/022; F16F 1/182; F16F 1/18; F16F 1/368; F16F 1/3737; Y10T 29/49611; Y10T 428/12389; Y10T 428/12403; B21D 53/886
    See application file for complete search history.

(56) References Cited

U.S. PATENT DOCUMENTS

| | | | |
|---|---|---|---|
| 291,814 A * | 1/1884 | Timmis | F16F 1/18 267/47 |
| 1,730,700 A | 10/1929 | Wallace | |
| 1,934,978 A | 11/1929 | Held | |
| 2,026,599 A * | 1/1936 | Wallace | F16F 1/185 267/47 |
| 2,533,511 A | 12/1950 | Rowland et al. | |
| 4,215,558 A * | 8/1980 | Shiguma | B21H 7/007 72/240 |
| 5,203,545 A | 4/1993 | Pierman | |

FOREIGN PATENT DOCUMENTS

| | | |
|---|---|---|
| DE | 515817 C | 12/1930 |
| DE | 102008061190 A1 | 6/2010 |
| GB | 467407 A | 6/1937 |
| GB | 576 388 A | 4/1946 |
| GB | 1151585 A1 * | 5/1969 |
| GB | 2 030 266 A | 4/1980 |
| WO | 03/064192 A2 | 8/2003 |
| WO | 2009/014423 A1 | 1/2009 |

OTHER PUBLICATIONS

International Search Report, dated Nov. 22, 2013, from corresponding PCT application.

* cited by examiner

Fig. 14

PROFILED BAR, AND VEHICLE SPRING PRODUCED THEREFROM

The invention relates to a profiled bar that is made of flat-bar steel, in particular spring steel, for producing a hot-deformed, in particular rolled, vehicle spring, as well as a method for producing such a profiled bar.

In addition, the invention relates to a vehicle spring with an elongated spring body, which is produced, in particular rolled, in a hot-deformed manner from a profiled bar, as well as a method for producing such a vehicle spring.

Moreover, the invention relates to a spring system for a vehicle.

As used in the invention, vehicle spring can be defined as an air spring (bar spring), a parabolic spring, a leaf spring, in particular a single-leaf parabolic spring and a multi-leaf parabolic spring, which are produced from flat-bar steel.

Within the framework of the invention, vehicle springs are hot-deformed, in particular rolled, from flat-bar steel, preferably spring steel, at temperatures of approximately 800 to 1200° C. In the case of hot-deformed vehicle springs that consist of flat-bar steel, the vehicle springs receive their springy function from the material, i.e., the vehicle spring has an inherent springy action because of the starting material. According to EN 10089, 3.1, spring steel is described as follows: "Materials, which because of their properties in the heat-treated state are especially suitable for the production of springy parts of all types. The springiness of steel is based on its elastic deformability, because of which it can be heavily loaded within a specific range without undergoing a permanent change in shape after the load is removed . . . ."

Spring systems are known, in which carriers are cast (e.g., as disclosed in DE10 2008 061 190) or welded (e.g., as disclosed in WO2003064192); these carriers are not springs in the conventional sense. Such carriers cannot—in contrast to the hot-deformable steel—be hot-deformed but rather can be processed only at significantly higher temperatures. In contrast to this, e.g., flat-bar steel that is made of spring steel is almost unweldable. Moreover, the cast or welded carriers do not gain a primarily springy action because of their material properties in the state of use in a spring system. Based on the material properties, these carriers form a rigid system per se. The springy action of this system is first achieved by the special connection of the carrier, in most cases by a lug that is incorporated in the carrier or a carrier support that is made of rubber.

When forging is done with forged steel (e.g., as disclosed in WO2009/014423), no spring is produced by rolling a profiled bar that is made of flat-bar steel.

Vehicle springs are used in motor vehicles, in particular in utility vehicles or trailers (towed vehicles). The requirements of the motor vehicle industry are characterized, on the one hand, by the reduction of the weight of individual components. On the other hand, due to increasing engine output, the requirements are characterized by the fact that individual components undergo increasingly high mechanical stresses. In this case, it is problematic in hot-deformed vehicle springs that are made of flat-bar steel that the weight of the vehicle spring cannot be easily reduced, since the vehicle spring, in particular of the spring body, must—because of its springy function—withstand other stresses as cast or welded products. To date, weight of a vehicle spring was reduced in that—starting from the same starting material for producing the vehicle spring—the geometry of the finished vehicle spring was changed to increase the surface tension in such a way that the vehicle spring could be constructed in a more compact manner.

The object of the invention is to make available a vehicle spring of the above-mentioned type, whose weight in comparison to a conventional vehicle spring is reduced, whereby the inherent springy function of the spring body continues to be ensured and the mechanical load capacity is not impaired. In certain applications, a more compact design can also be achieved.

According to the invention, it is provided that the profiled bar has at least one material recess, which is provided over its length at least in some places. Thus, the weight of the vehicle spring produced from the profiled bar can be reduced by the geometry of the starting product that is used up to approximately 30% or more, whereby the force absorption and the springy action of the spring body are not impaired. Also, more compact vehicle springs can thus be produced at a consistent weight.

Within the framework of the invention, the profiled bar is preferably produced from a spring steel according to DIN EN 10089.

In an especially preferred embodiment, the material recess extends over the entire length of the profiled bar. In addition, it is preferred that the cross-sectional shape of the profiled bar is the same over its length, i.e., that the cross-sectional shape of the profiled bar does not change over its length.

Within the framework of the invention, the profiled bar has a top, a bottom and two narrow sides, whereby at least one material recess is provided preferably in at least one narrow side. As an alternative or in addition to this, at least one material recess can be provided in the bottom.

In particular, it is preferred when the material recess is punched out as a depression in width b and/or in height h of the profiled bar in at least one central area of the bottom or the narrow side. The profiled bar has a longitudinal axis, a transverse axis that runs crosswise to the longitudinal axis, which transverse axis preferably corresponds to the neutral fiber, as well as an axis that runs at right angles to the transverse axis from the bottom to the top, whereby in an especially advantageous embodiment, a material recess runs in the area of the transverse axis and/or in the area of the axis, and/or whereby the cross-sectional shape is symmetric to the axis.

In an especially preferred embodiment of the invention, the profiled bar in the cross-section corresponds to an I-profile. Within the framework of the invention, other profile shapes can also be provided, such as, e.g., U- or T-profiles.

According to the invention, it is furthermore provided that the profiled bar is produced by material being displaced in the longitudinal direction of the profiled bar.

It is provided according to the invention, moreover, that the hot-deformed spring body, which has a springy action in the installed state, has at least one material recess, which is provided over its length at least in some places.

In one embodiment of the invention, the material recess can extend over the entire length of the vehicle spring. In other embodiments of the invention, it can be provided that the length of the material recess is 1 to 99% of the length of the vehicle spring, in particular 10 to 90% or 20 to 80% or 40 to 40% or approximately 50% of the profiled bar.

In an especially preferred embodiment of the invention, the spring body corresponds at least in sections to an I-profile in cross-section. Within the framework of the invention, other profile shapes can also be provided, such as, e.g., U- or T-profiles.

Since rolling processes take place during the production of vehicle springs, it is preferred within the framework of the invention when the cross-sectional shape of the spring body changes over its length, in particular when the width of the material recess changes over the length of the material recess. Thus, the width of the material recess can be matched to the optimal shape of the finished spring, whereby areas with different bending strength can also be achieved.

The depth of the material recess in the profiled bar and/or in the spring body can increase or decrease continuously or intermittently over the width of the material recess—considered in cross-section. The depth of the material recess can increase and/or decrease continuously, e.g., straight or arc-shaped, or can increase and/or decrease, e.g., in steps, whereby the depth of the material recess remains the same in sections. Also, the depth of the material recess can first increase, and then remain the same or decrease, and then increase again, or the depth can only increase.

As material recesses, one or more grooves (material recesses) that optionally run parallel to one another can also be provided.

A vehicle spring is produced from an elongated profiled bar according to the invention in such a way that the profiled bar with at least one material recess, which is provided over the length of the profiled bar at least in some places, is hot-deformed, in particular rolled. In particular, it can be provided that as starting material for the hot deformation, a profiled bar with at least one material recess is used, whose cross-sectional shape is the same over its entire length, whereby during hot deformation, the width of the material recess changes to a varying extent over the length of the spring body.

Within the framework of the invention, material recess is defined as a savings of material, i.e., that material otherwise present in the area of the material recess is replaced by the material recess, or that otherwise present material is not present. In particular, within the framework of the invention, material recess can be defined as material in the area of the material recess being displaced in the longitudinal direction of the profiled bar. In contrast to this, e.g., finned leaf springs do not have any material recess, since here, the material is not "displaced" in longitudinal direction but rather in the direction perpendicular to the transverse axis of the profiled bar. Also, e.g., imprints in a profiled bar or in a vehicle spring do not mean a material recess, since in the case of imprints, material is not displaced over the (preferably entire) longitudinal direction of the profiled bar or the spring body.

During the production of the profiled bar according to the invention, material is displaced in the longitudinal direction of the profiled bar. This can take place in that the profiled bar is guided along a form that has at least one protrusion, for example a nose, whose cross-sectional shape represents a negative image of the desired cross-sectional shape of the material recess in the finished profiled bar.

For example, the production process of a vehicle spring can be summarized as follows:

A profiled bar, in particular a flat-bar steel, with a material recess with a consistent cross-sectional shape over its entire length, is cut to the desired length. Within the framework of the invention, preferably a flat-bar steel according to EN 10092 or BS 970-2 and a spring steel according to EN 10089 or EN 10083 are used as starting material; however, other hot-deformable steels can also be used. Within the framework of the invention, depending on the country/region, standardized spring steels or heat-treatable steels can also be used. For the subsequent hot forming, the profiled bar is brought to a temperature of approximately 800 to 1200° C. The profiled bar that is cut to length is rolled horizontally or vertically at this temperature, and the ends are processed accordingly depending on the desired vehicle spring. For rolling, the profiled bar is heated on one side, run between an open pair of rollers and then moved between the latter one or more times in the longitudinal direction. In this processing process, the gap between the rollers can be varied so that the desired shape of the profiled bar is set. When the profiled bar is rolled, the width of the material recess can thus also be changed in a varying manner over the length of the profiled bar by exerting varying pressures. Then, the profiled bar is heated on the opposite side, and a renewed rolling process is performed.

Depending on the desired vehicle spring, in particular when multiple springs are to be arranged over one another in the state of use (multi-layer springs), a center hole, a blind hole or other depressions for a spring screw or other positive elements can be introduced. The profiled bar can receive one or two lugs in an additional step. The rolled profiled bar that is heated again or is still at the necessary temperature can then optionally run through one or more pressing stations for final processing, after which a rolling process can be performed. The rolling of the ends to form lugs also takes place at temperatures from approximately 800 to 1,200° C. In additional steps, the spring (at approximately 900° C.) can be bent and then heat-treated.

Depending on the type of vehicle spring, both ends can have a lug. One end can also have a rolled or molded-on lug, e.g., introduced into the spring body; conversely, the other end is essentially flat. In the last-mentioned embodiments, the profiled bar can be angled or bent in particular in the area of the flat end. In another embodiment, two ends can also be essentially flat and optionally slightly bent (without a lug).

Depending on the type of vehicle spring, the processing steps can be changed. Within the framework of the invention, the profiled bar can also be heated initially to a specific processing temperature, whereby in the case of the subsequent processing steps, no further heating is necessary.

Features of the cross-sectional shape or shapes of the profiled bar, in particular the shape of the material recess over the height of the profiled bar, can also be present in the spring body. Features of the cross-sectional shape or shapes of the spring body, in particular the shape of the material recess over the height of the spring body, can also be present in the profiled bar.

Preferred and advantageous embodiments of the invention follow from the description below with reference to the attached drawings, in which preferred embodiments are depicted.

Here.

Figure 2:
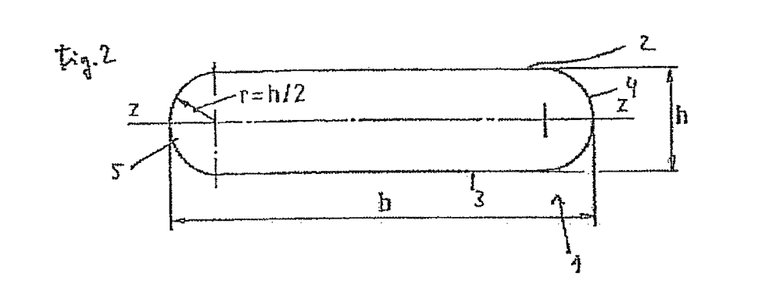
Figure 3:
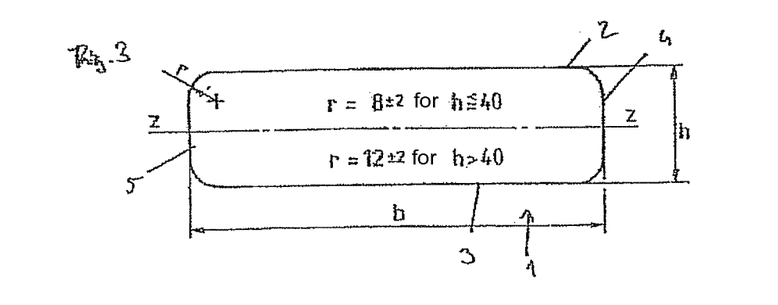
Figure 4:
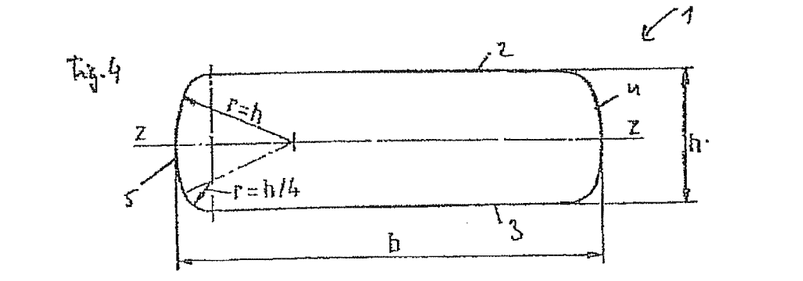
Figure 5:
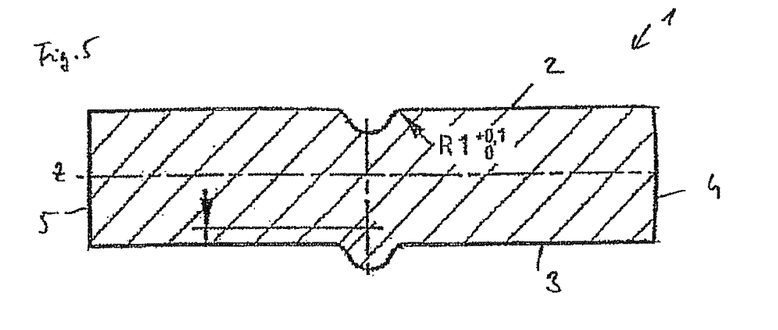

In FIGS. 1 to 5, cross-sectional shapes of profiled bars 1 that are made of flat-bar steel and that are known to date are depicted, namely a natural-edged profile (FIG. 1), a profile with semi-circular narrow sides (FIG. 2), a profile with rounded edges (FIG. 3) and a basket-arch profile (British Standard) (FIG. 4). FIG. 5 shows in cross-section a hot-deformable profiled bar 1 for finned leaf springs.

Figure 1:
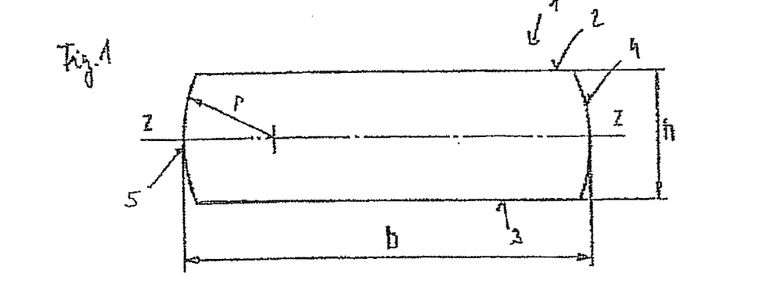
FIGS. 1 to 5 show known cross-sectional shapes of profiled bars for vehicle springs that are made of hot-deformable steel.

The hot-deformable profiled bars 1 depicted in FIGS. 1 to 3 correspond to DIN EN 10092-1. FIG. 4 shows a hot-deformable profiled bar 1 that is made of flat-bar steel with a cross-sectional shape according to British Standard BS 970-2:1988 b. The hot-deformable profiled bar 1 depicted in FIG. 5 corresponds to DIN EN 10092-2. The profiled bars 1 have a top 2, a bottom 3 and two narrow sides 4, 5. Furthermore, in FIGS. 1 to 4, the width b, the height h, and the transverse axis z (this also corresponds to the neutral fiber defined with respect to the bending stress) of the profiled bars 1 as well as radii of curvature r are indicated. According to FIGS. 1 to 4, the profiled bars 1 have no material recess over their length. Also, the profiled bar 1 depicted in FIG. 5 has no material recess over its length, since in the finned area, all material is present, and the material is also not displaced in the longitudinal direction.

In contrast to the known profiled bars 1, a profiled bar 1 according to the invention has at least one material recess 6. Thus, the weight of a hot-rolled vehicle spring can be reduced by the starting material, whereby the force absorption and the springy action of the vehicle spring are not impaired.

Figure 6:
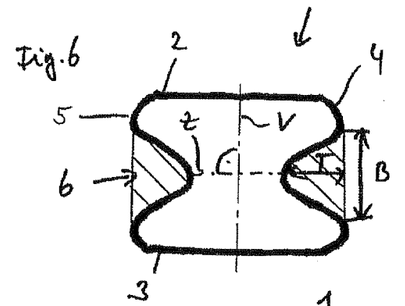
FIGS. 6 to 11 show embodiments of profiled bars for a vehicle spring according to the invention in cross-section.

By way of example, a profiled bar 1 (in particular that is made of flat-bar steel) is depicted in FIG. 6, which bar (starting from a known profiled bar 1 according to FIG. 3) in its two narrow sides 3, 4 in each case has a material recess 6 with a width B and a depth T. The material that is otherwise present on the narrow sides 4, 5 (as in, e.g., FIG. 3) is displaced in the profiled bar 1 according to FIG. 6 along its longitudinal direction and is no longer present in the profiled bar 1. In the embodiment depicted in FIG. 6 and in FIG. 7, the profiled bar 1 has an I-profile with a material recess 6 that is arc-shaped in cross-section. The depth T of the material recess 6 continuously increases first over its width B and then continuously decreases again.

Figure 7:
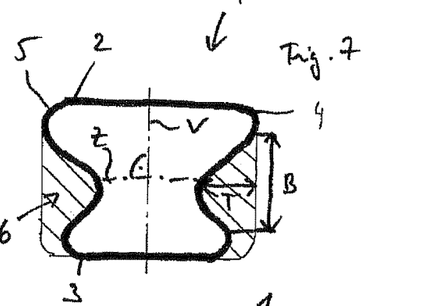

A difference between the embodiments depicted in FIGS. 6 and 7 is that the bottom 3 of the profiled bar 1 according to FIG. 7 is less wide than its top 2.

Figure 8:
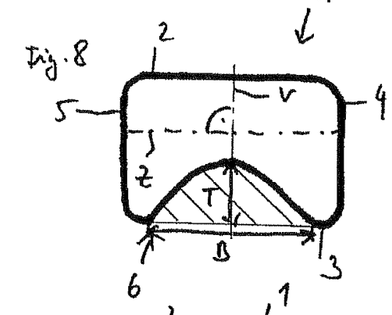

In the embodiment depicted in FIG. 8, the profiled bar 1 has a U-profile that is open downward with a material recess 6 that is arc-shaped in cross-section, i.e., the material recess 6 is provided in the bottom 3.

Figure 9:
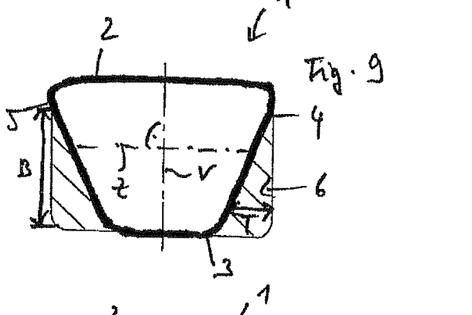

In the embodiment depicted in FIG. 9, the profiled bar 1 has an essentially trapezoidal cross-sectional shape with rounded edges. The material recess 6 runs from the upper area of the profiled bar 1 in a straight line to the bottom 3, whereby the depth T of the material recess 6 continuously increases over its width B. The material recess 6 is provided in two narrow sides 4, 5 as well as in the bottom 3.

Figure 10:
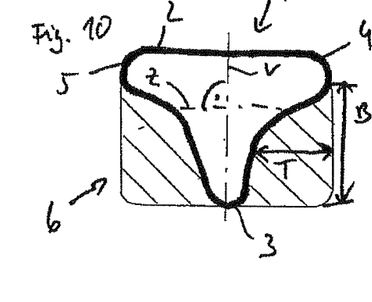

In the embodiment depicted in FIG. 10, the profiled bar 1 has a T-profile with a material recess 6 that is wave-shaped in cross-section. Also, in this embodiment, the depth T of the material recess 6 increases continuously over its width in the direction toward the bottom 3.

Figure 11:
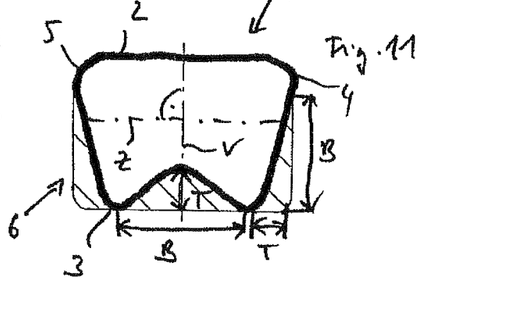

In the embodiment depicted in FIG. 11, material recesses 6 are provided in the two narrow sides 4, 5, which recesses are shaped similar to those in FIG. 9. Moreover, a material recess 6 is provided in the bottom 3, which recess is shaped similar to that in FIG. 8.

A feature that all depicted embodiments of profiled bars 1 according to the invention have in common is that the profiled bar 1 has a transverse axis z that runs crosswise to its longitudinal axis (the latter can correspond to the neutral fiber) as well as an axis V that runs at right angles to the transverse axis z and that the cross-sectional shape is symmetric to the axis V. Furthermore, all embodiments shown have in common the fact that the material recess 6, relative to an imaginary cross-sectional surface that is formed by the width b and the height h of the profiled bar 1 (depicted in hatching in FIGS. 6 to 11), extends into the profiled bar 1. Relative to the imaginary cross-sectional surface, formed by the width b and the height h of the profiled bar 1, edge areas can be defined by the height h and the width b in the area of the corners (these can also be rounded corners), as well as central areas. Within the framework of the invention, the material recess 6 is a depression of width b and/or height h of the profiled bar 1 in at least one central area. In particular, it can be provided that at least one material recess 6 runs in the area and in particular along the transverse axis z and/or in the area and in particular along the axis (V).

In the depicted profiled bars 1, the material recess 6 extends over the entire length of the profiled bar 1, whereby the cross-sectional shape of the profiled bar 1 does not change over its entire length.

If a vehicle spring with a spring body 20 can be produced from the profiled bar 1, one or more features of the material recess 6 contained in the profiled bar 1 can also be present in the spring body 20. Also, the shape of the material recess in the spring body 20 (for example, width B of the material recess 6 that continuously or intermittently increases and/or decreases over the height of the spring body 20 or, for example, depth T of the material recess 6 that continuously or intermittently increases and/or decreases over the width B of the material recess 6) can already be present in the profiled bar 1. In the finished vehicle spring, mixed shapes of possible material recesses 6 or cross-sectional shapes can also be present. In the finished vehicle spring, the material recess 6 cannot run over the entire length of the spring body 20, whereby the cross-sectional shape of the material recess 6 in the spring body can change.

Figure 12:
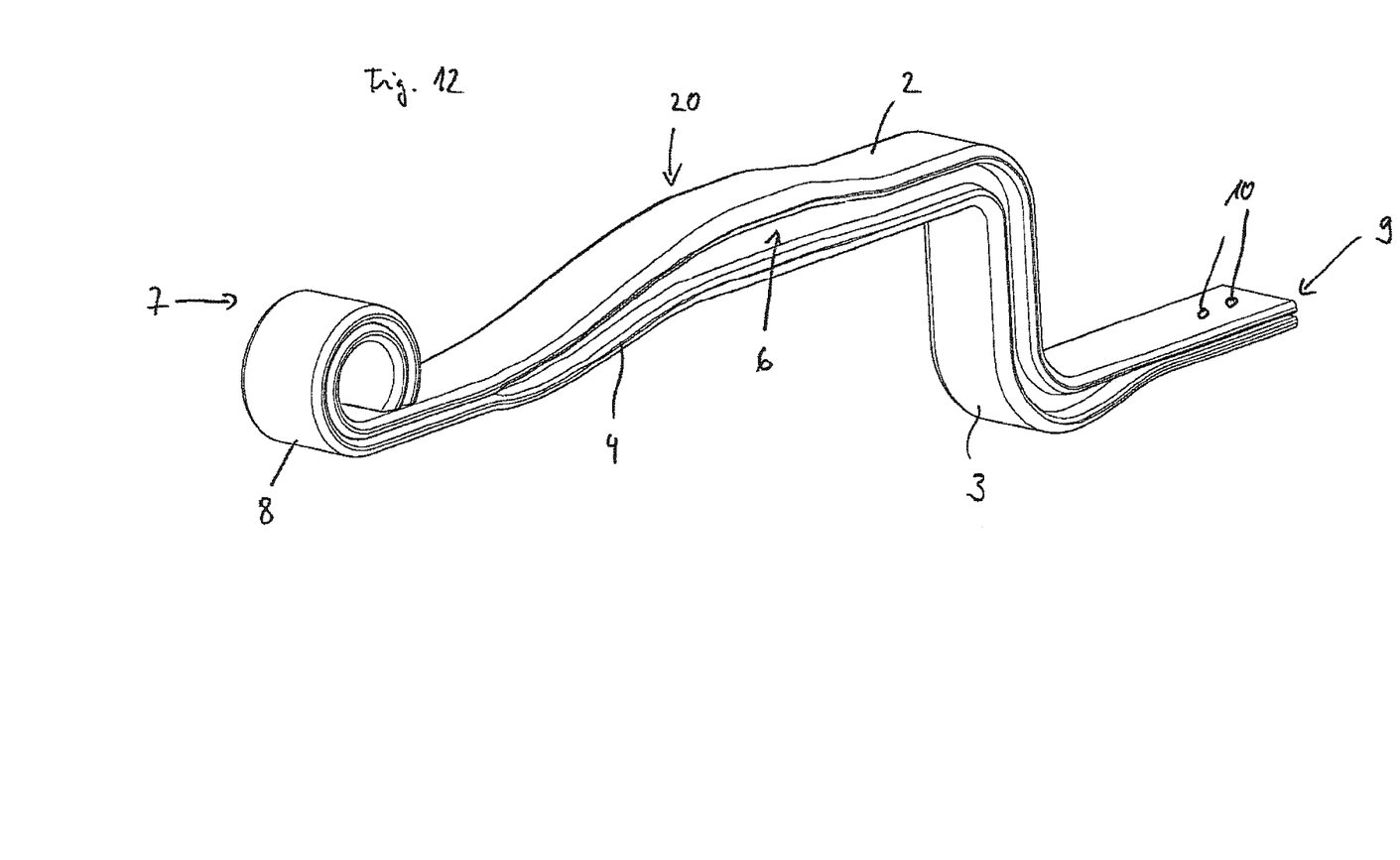
FIG. 12 shows a first embodiment of a bar spring according to the invention with a rolled lug.

In FIG. 12, an embodiment of a bar spring according to the invention with a spring body 20 that is made of a hot-deformed profiled bar 1 is depicted. The bar spring has a rolled lug 8 on one of its longitudinal ends 7. The other longitudinal end 9 is angled and has two boreholes 10, which are used for mounting, e.g., an air spring bellows.

The spring body 20 has a through material recess 6 over a major part of its length on the two narrow sides 4, 5 and is vigorously rolled to a varying extent over its length. Because of the rolling, the width B of the material recess 6 changes over the length of the spring body 20. The depth T of the material recess 6 continuously increases and decreases again in this embodiment. In the embodiment depicted in FIG. 12, the spring body 20 has an I-profile, whereby the material recess 6 over the length of the spring body 20 has a depth T that is consistent for the most part.

Figure 13:
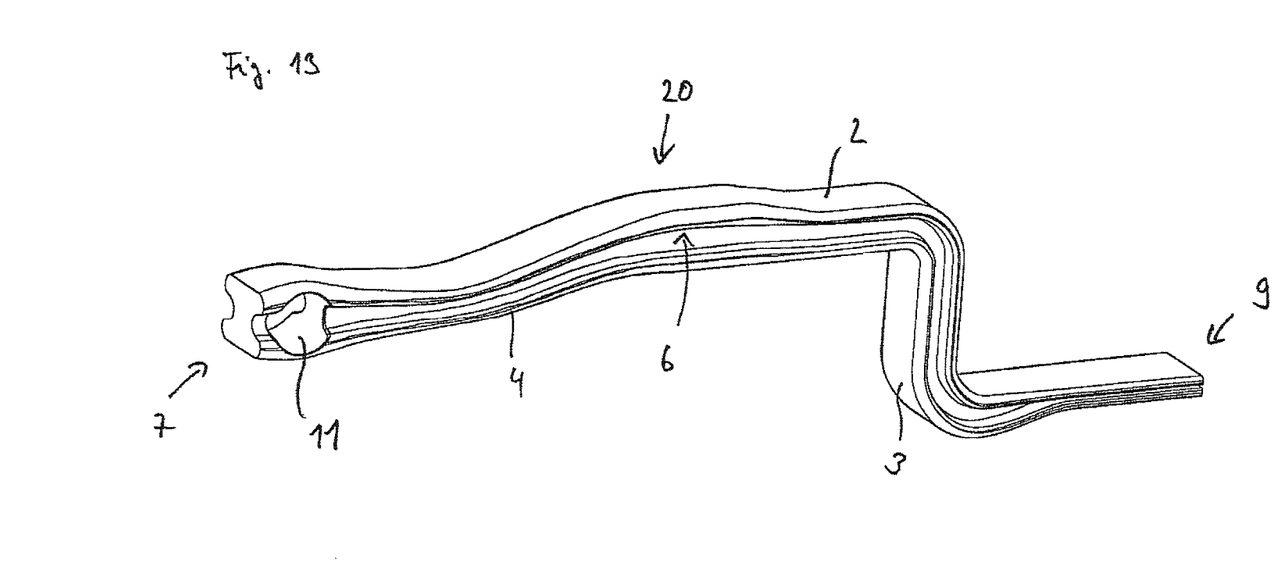
FIG. 13 shows a second embodiment of a bar spring according to the invention with a lug introduced into the spring body.

In FIG. 13, another embodiment of a bar spring according to the invention that consists of a hot-deformed profiled bar 1 is depicted. On one of its longitudinal ends 7, the bar spring has a molded-on lug 11. The other longitudinal end 9 is angled.

The spring body 20 has a through material recess 6 over its entire length on the two narrow sides 4, 5, and is vigorously rolled to a varying extent over its length. Because of the rolling, the width B of the material recess 6 changes over the length of the spring body 20. The depth T of the material recess 6 increases and decreases to a varying extent in this embodiment. In the area of the longitudinal end 7, in which area the lug 11 is molded-on, the spring body 20 has an I-shaped profile according to the profiled bar 1 of FIG. 6. Its cross-sectional shape changes over the length of the spring body 20; e.g., in the central section of the profiled bar 1, the depth T of the material recess 6 essentially increases and decreases in stages.

Figure 14:
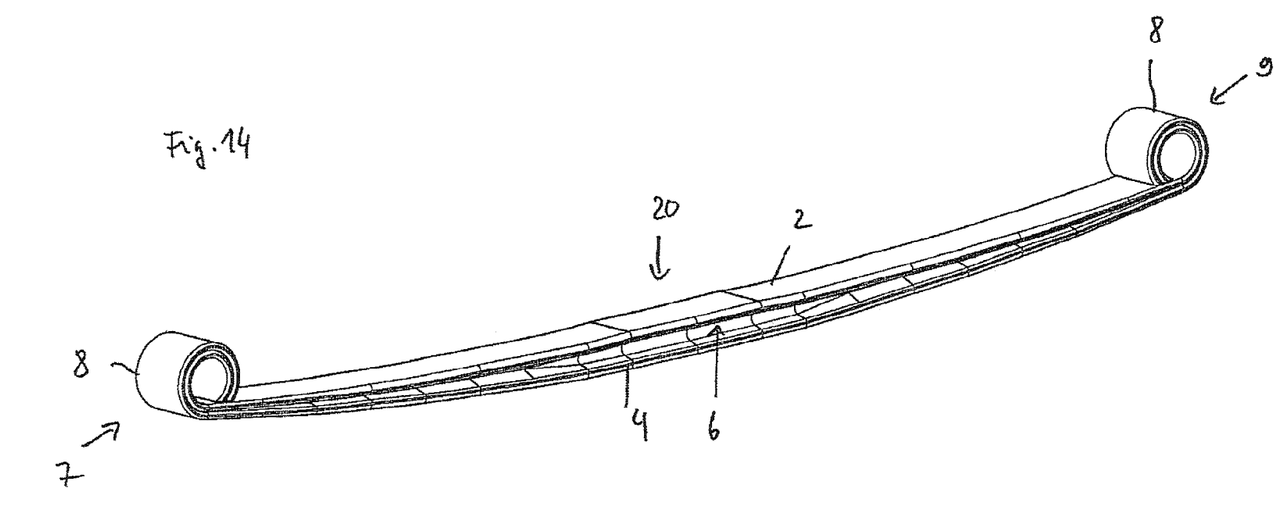
FIG. 14 shows an embodiment of a parabolic spring according to the invention.

In FIG. 14, an embodiment of a parabolic spring according to the invention that consists of a hot-deformed profiled bar 1 is depicted. The parabolic spring has a rolled lug 8 on both ends. The spring body 20 has an I-profile viewed in cross-section, whereby the width of the material recess 6 over a portion of the length of the spring body 20 increases or decreases and remains the same over a part of the length of the spring body 20.

In the FIGS. 12 to 14 (as also in particular in FIGS. 6 and 7), the spring body 20 (or profiled bar 1) has a neutral fiber, whereby the material recess 6 is a depression of width b of the profiled bar 1 over its height h in the area of and along the neutral fiber. This preferred embodiment can also hold true in the case of cross-sectional shapes that are not depicted.

In summary, an embodiment of the invention can be depicted as follows:

A vehicle spring for a spring system with a spring body 20 is produced in a hot-deformed manner, in particular rolled, from a profiled bar 1 that is made of flat-bar steel, in particular spring steel. The profiled bar 1 or the spring body 20 has at least one material recess 6, which is provided at least in some places over its length. The cross-sectional shape of the profiled bar 1 can be the same over its entire length; conversely, the cross-sectional shape in the spring body 20 can change over its length.

The invention claimed is:

1. A profiled bar that is made of flat-bar, spring steel for producing a hot-deformed, rolled, vehicle spring having an elongated spring body, the profiled bar having a longitudinal axis, a transverse axis (z) that runs crosswise to the longitudinal axis and that corresponds to the neutral fiber, and an axis (v) that runs at right angles to the transverse axis (z) from the bottom to the top of the profiled bar,
the profiled bar having a cross section perpendicular to the longitudinal axis thereof, the cross section having a top side, a bottom side, and first and second narrow sides, each of said first and second narrow sides extending between the top and bottom sides, a portion of one of the top side and the bottom side defining a first flat segment, the first flat segment and the neutral fiber extending in parallel to one another,
wherein at least one material recess having a depth which increases and decreases across the width thereof is provided in at least one of the first and second narrow sides, and at least in some places over the length of, the profiled bar.

2. The profiled bar according to claim 1, wherein the at least one material recess extends over the entire length of the profiled bar.

3. The profiled bar according to claim 1, wherein the cross-sectional shape of the profiled bar is the same over the length of the profiled bar.

4. The profiled bar according to claim 1 having a second material recess, the second material recess having a depth which increases and decreases across the width thereof and being provided in the bottom side of, and at least in some places over the length of, the profiled bar.

5. The profiled bar according to claim 1 wherein the at least one material recess overlaps the transverse axis (z).

6. The profiled bar according to claim 1 wherein the cross-sectional shape of the profiled bar is symmetric to the axis (V).

7. The profiled bar according to claim 1 wherein a cross-section perpendicular to the longitudinal axis of the profiled bar corresponds to an I-profile.

8. The profiled bar according to claim 1 wherein a portion of the other one of the top side and the bottom side defines a second flat segment.

9. The profiled bar according to claim 8 wherein the first flat segment and the second flat segment extend in parallel to one another.

10. A vehicle spring with an elongated spring body, which is produced in a rolled, hot-deformed manner from a profiled bar, the elongated spring body having a longitudinal axis, a transverse axis (z) that runs crosswise to the longitudinal axis and that corresponds to the neutral fiber, and an axis (v) that runs at right angles to the transverse axis (z) from the bottom to the top of the elongated spring body,
the elongated spring body having a cross section perpendicular to the longitudinal axis of the elongated spring body, said cross section having a top side, a bottom side, and first and second narrow sides, each of said first and second narrow sides extending between the top and bottom sides, a portion of one of the top side and the bottom side defining a first flat segment, the first flat segment and the neutral fiber extending in parallel to one another,
wherein at least one material recess having a depth which increases and decreases across the width thereof, is provided in at least one of the first and second narrow sides, and at least in some places over the length of the elongated spring body.

11. The vehicle spring according to claim 10, wherein the at least one material recess extends over the entire length of the elongated spring body.

12. The vehicle spring according to claim 10, wherein the length of the at least one material recess is 20 to 80% of the length of the elongated spring body.

13. The vehicle spring according to claim 10 wherein the width (B) of the at least one material recess changes over the length of the material recess which length extends along the longitudinal axis of the elongated spring body.

14. The vehicle spring according to claim 10, wherein the depth (T) of the at least one material recess changes continuously or intermittently over the width (B) of the at least one material recess.

15. The vehicle spring according to claim 10 having a second material recess, the second material recess being provided in the bottom side of the elongated spring body.

16. The vehicle spring according to claim 10, wherein the at least one material recess overlaps the transverse axis (z) of the elongated spring body.

17. The vehicle spring according to claim 10, wherein the cross-sectional shape of the elongated spring body is symmetric to the axis (V).

18. The vehicle spring according to claim 10, wherein a cross section perpendicular to the longitudinal axis of the elongated spring body corresponds to an I-profile.

19. The vehicle spring according to claim 10, wherein the elongated spring body has two longitudinal ends and a rolled lug or molded-on lug on at least one longitudinal end.

20. The elongate spring body according to claim 10, wherein a cross section perpendicular to the longitudinal axis of the elongated spring body corresponds to a T profile.

21. The elongated spring body of claim 10 wherein a portion of the other one of the top side and the bottom side defines a second flat segment.

22. The elongated spring body of claim 21 wherein the first flat segment and the second flat segment extend in parallel to one another.

* * * * *